United States Patent
Dogin et al.

(10) Patent No.: US 10,043,164 B2
(45) Date of Patent: Aug. 7, 2018

(54) SYSTEM AND METHOD FOR FACILITATING A TRANSACTION BETWEEN A MERCHANT AND A CARDHOLDER

(71) Applicant: MASTERCARD INTERNATIONAL INCORPORATED, Purchase, NY (US)

(72) Inventors: Jennifer Dogin, Mamaroneck, NY (US); Brian Maw, Norwalk, CT (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 584 days.

(21) Appl. No.: 13/897,991

(22) Filed: May 20, 2013

(65) Prior Publication Data

US 2014/0344011 A1 Nov. 20, 2014

(51) Int. Cl.
*G06Q 10/00* (2012.01)
*G06Q 20/12* (2012.01)
(Continued)

(52) U.S. Cl.
CPC ......... *G06Q 20/12* (2013.01); *G06Q 20/3224* (2013.01); *G06Q 30/00* (2013.01);
(Continued)

(58) Field of Classification Search
CPC ........... G06Q 30/0207–30/0277; G06Q 20/12; G06Q 20/3224; G06Q 30/00; G06Q 30/016; G06Q 30/0201
USPC .................................................. 705/7.29, 39
See application file for complete search history.

(56) References Cited

U.S. PATENT DOCUMENTS 8,559,931 B2 * 10/2013 Moon ................... H04W 4/001
455/414.2
9,426,620 B2 * 8/2016 Xu ......................... H04W 4/021
(Continued)

OTHER PUBLICATIONS

National Retail Federation (Mobile Retailing Blueprint a Comprehensive Guide for Navigating the Mobile Landscape, Jan. 4, 2011). (Year: 2011).*

*Primary Examiner* — Hafiz A Kassim
(74) *Attorney, Agent, or Firm* — Ohlandt, Greeley, Ruggiero & Perle, L.L.P.

(57) ABSTRACT

A system and method for facilitating a transaction, e.g., shopping experience, between a merchant and a cardholder. The system comprises an electronic storage device having a database of cardholder profile information and location information stored therein; an access path for allowing access to the cardholder profile information and location information; and a processor for assembling the cardholder profile information and location information in the database, and for providing the assembled cardholder profile information and location information to a merchant and a cardholder that have been granted access to the database. The assembled cardholder profile information and location information are provided to the merchant and the cardholder so as to effect targeted interaction between the merchant and cardholder based at least in part on the assembled cardholder profile information and location information. A method for monitoring efficiency of a transaction between a merchant and a cardholder, and for determining customer shopping trends at a merchant facility.

27 Claims, 6 Drawing Sheets

(51) Int. Cl.
*G06Q 30/02* (2012.01)
*G06Q 30/00* (2012.01)
*G06Q 20/32* (2012.01)

(52) U.S. Cl.
CPC ....... *G06Q 30/016* (2013.01); *G06Q 30/0201* (2013.01); *G06Q 30/0207* (2013.01)

(56) References Cited

U.S. PATENT DOCUMENTS

| | | | | |
|---|---|---|---|---|
| 2004/0128256 | A1* | 7/2004 | Krouse | G06Q 20/04 705/65 |
| 2005/0040230 | A1* | 2/2005 | Swartz | G06K 17/00 235/383 |
| 2007/0069923 | A1* | 3/2007 | Mendelson | G01C 21/206 340/988 |
| 2009/0043504 | A1* | 2/2009 | Bandyopadhyay et al. | 701/213 |
| 2009/0307060 | A1* | 12/2009 | Merz et al. | 705/10 |
| 2009/0328052 | A1* | 12/2009 | Nguyen | G06Q 20/32 718/104 |
| 2010/0102122 | A1* | 4/2010 | Skowronek | G06Q 20/32 235/380 |
| 2010/0268581 | A1* | 10/2010 | Biancardini | G06F 8/60 705/14.4 |
| 2011/0029430 | A1* | 2/2011 | Norris et al. | 705/39 |
| 2011/0087519 | A1* | 4/2011 | Fordyce et al. | 705/7.29 |
| 2011/0131097 | A1* | 6/2011 | Taylor et al. | 705/14.66 |
| 2011/0302084 | A1* | 12/2011 | Melik-Aslanian | G06Q 20/10 705/44 |
| 2011/0320319 | A1* | 12/2011 | Streich | G06Q 30/06 705/27.1 |
| 2012/0072341 | A1* | 3/2012 | O'Neil | G06F 9/5055 705/39 |
| 2012/0101881 | A1* | 4/2012 | Taylor et al. | 705/14.13 |
| 2012/0126974 | A1* | 5/2012 | Phillips | G08B 21/0236 340/539.13 |
| 2012/0296818 | A1* | 11/2012 | Nuzzi | G06Q 20/3224 705/41 |
| 2013/0054336 | A1* | 2/2013 | Graylin | H04L 67/02 705/14.26 |
| 2013/0073388 | A1* | 3/2013 | Heath | 705/14.53 |
| 2013/0073400 | A1* | 3/2013 | Heath | G06Q 30/02 705/14.73 |

* cited by examiner

SYSTEM AND METHOD FOR FACILITATING A TRANSACTION BETWEEN A MERCHANT AND A CARDHOLDER

BACKGROUND OF THE DISCLOSURE

1. Field of the Disclosure

The present disclosure relates to a system and method for facilitating a transaction, e.g., shopping experience, between a merchant and a cardholder.

2. Description of the Related Art

A variety of difficulties, inconveniences, and/or inefficiencies may be encountered in conjunction with transactions involving goods and services between merchants and customers. For example, it can be cumbersome and time consuming for the customer to locate the section of the store (e.g., the lumber aisle, the flooring aisle, the plumbing aisle) where the items the customer desires (e.g., plywood, ceramic flooring, bathroom plumbing fixtures) are located, to find the most efficient path between each of those locations, and to find a sales person to help with questions. From the perspective of the merchant, it may be desirable to make the task of shopping more efficient, convenient, and satisfying for the customer. It may also be desirable to increase sales by presenting customers with an increased number of choices in specific areas, by increasing the effectiveness of incentive offerings, and by reducing the impact and/or occurrence of undesirable events.

Similarly, from a supplier's perspective and also from a merchant's perspective, it may also be desirable to have a merchant improve the customer's shopping experience and to increase the volume of sales in many of the same ways as the merchant, but it may also be desirable to acquire information about consumer behavior and their actions in response to specific stimuli. For example, suppliers of goods may wish to test the effectiveness of specific targeted offers or coupons, which may be tailored to individual customers and/or identifiable environmental conditions. In addition, it may be desirable to improve the ability of suppliers and other participants in the supply chain (e.g., raw material suppliers, manufacturers, producers, wholesalers, distributors, truckers, financiers, investors) to easily and quickly collect and access information regarding the flow of goods and services to customers. Such information may be useful to effectively test various marketing and/or distribution tactics and may also be useful in effectively managing production and distribution to reduce necessary inventories.

Although it may be a goal of most or all participants in the supply chain to improve the customer's shopping experience, several aspects of the traditional shopping process may detract from this goal. For example, once a customer has traveled to the merchant's facility, the customer can then wait for extended periods for a sales person to get information about the particular transaction and also to get directions to the desired goods which may be located in different areas of the merchant's facility. Delays may be encountered due to the inability to find the right sales person, inability to find the desired location in the merchant's facility, the number of other patrons waiting before the customer, or inefficiencies in dealing with the other customers and/or the sales person.

As an example, a customer is in an electronics superstore and is looking at TVs but there are no sales people around. If the customer wanders into the computer area, he or she may see two sales people who promptly tell the customer they can't help since they don't work in TV department, and then sometimes they will try to find the correct sales person for the customer. All of this can take 5, 10, 20 minutes or longer. It is a waste of the customer's time, leads to lowered customer loyalty, and from the merchant's point of view is a waste of the value that an expert employee brings to the brick and mortar shopping experience versus buying something online.

A simple system and/or method for facilitating a transaction, e.g., shopping experience, between a merchant and a customer would be very advantageous to the customer by enabling the customer to connect to expert resources in the merchant's facility when and where the customer needs it. It could also offer advantages to merchants by allowing store management to be able to spot trends in needed help, what product areas are "hot" on what days, and allow for more specific and flexible staffing.

SUMMARY OF THE DISCLOSURE

There is provided a system and method for facilitating a transaction, e.g., shopping experience, between a merchant and a customer, e.g., cardholder. The system and method of this disclosure enables targeted and timely customer service, thereby providing benefits to both the customer and merchant.

There is also provided such a customer focused system and method which allows customers, e.g., cardholders, to connect to expert resources in the merchant's facility when and where the customer needs it.

There is further provided a system and method for monitoring efficiency of a transaction between a merchant and a cardholder, in particular, enabling a merchant to provide targeted and timely customer service in the most cost effective manner.

There is yet further provided a system and method of tracking transaction information and data that allows merchant store management to be able to spot trends in needed help, what product areas are "hot" on what days, and allow for more specific and flexible staffing.

There is also provided such a customer focused system and method having additional value added services such as 2D or 3D global positioning system (GPS) mapping, both inside and outside of a merchant facility, including floor plans inside a merchant facility to help direct a customer to a desired area or to help direct an employee to a desired inventory stored at the merchant facility.

There is further provided such a system and method in which the customer has access to a payment card customer service, help desk or call center that can provide requested information to a customer such as credit card benefits that may apply to a particular purchase, e.g., credit card benefits such as extended warranty on purchases, price protection, insurance, roadside assistance, emergency travel assistance, no foreign transaction fees, rental car insurance, and hotel and airline upgrades.

BRIEF DESCRIPTION OF THE DRAWINGS

A component or a feature that is common to more than one figure is indicated with the same reference number in each figure.

DESCRIPTION OF THE PREFERRED EMBODIMENT

As used herein, "merchant" means a business, company, employer, seller, vendor, supplier, representative of the merchant including, but not limited to, sales persons, agents, clerks, employees, managers, officers, suppliers, contractors, and the like. A merchant can be any person or company engaged in the purchase and/or sale of goods and/or services.

As used herein, "transaction" means any interaction between a business and its customers, vendors, suppliers and others with whom they do business, typically for the purpose of selling and buying products and/or services. The businesses can include, for example, top retailers, entertainment and toy companies, restaurants, family fun, and the like. The products and services can include, for example, family fun, sports, restaurants, events, groceries, apparel, beverages, beauty products, books and magazines, foods, health care, household, furniture, office, personal care, pet care, photography, and the like.

As used herein, "customer" means a buyer, purchaser, or the recipient of a product, service or good from a merchant, seller, vendor or supplier, typically for monetary or other valuable consideration. As used herein, "cardholder" means a person or entity that possesses a payment card (e.g., credit card and/or debit card from a payment card company such as MasterCard®, VISA® or American Express®).

Figure 1:
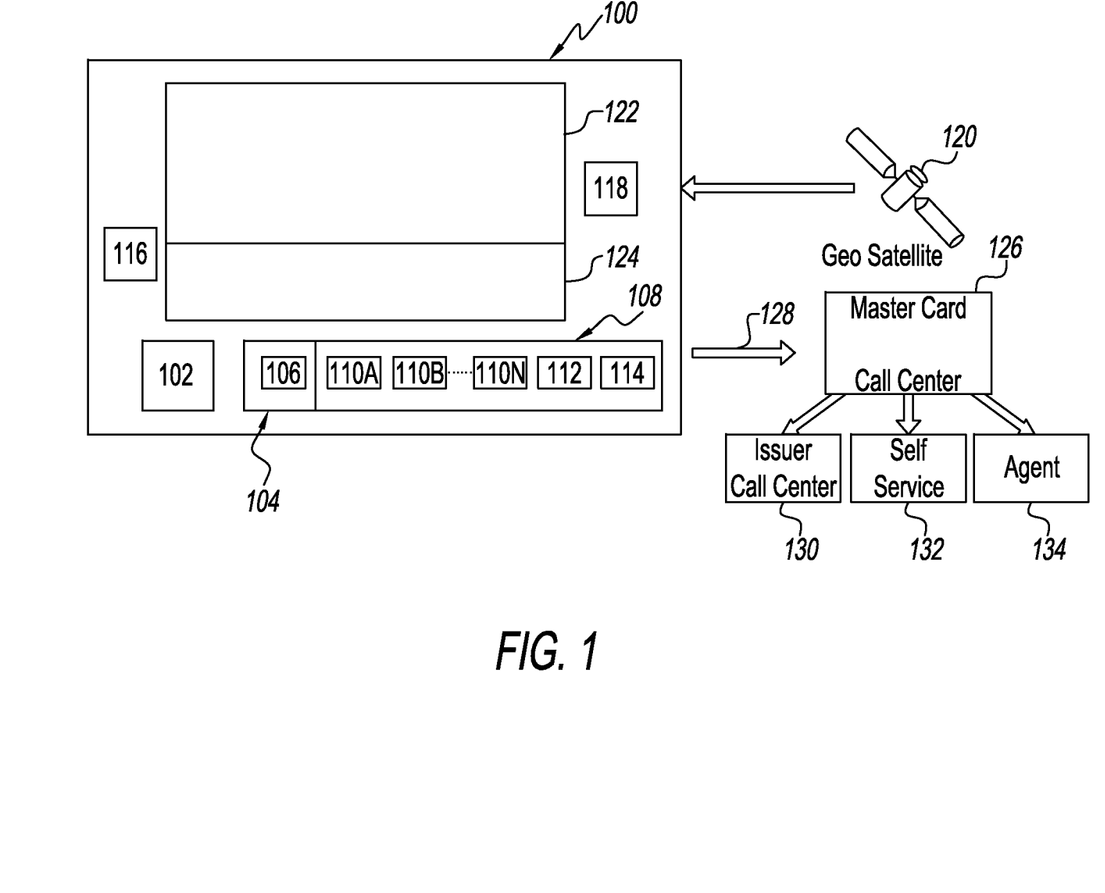
FIG. 1 depicts a diagram of a system for implementing an exemplary embodiment of the present disclosure, including an illustrative mobile communication device that is useful in the method of this disclosure.

Referring to the drawings and, in particular, FIG. 1, a mobile communication device generally represented by reference numeral 100 is shown. In one embodiment of the present disclosure, communication device 100 is a smart mobile telephone. Communication device 100 has a data processor 102 and a memory 104. Memory 104 stores an operating system 106, and has a memory portion 108 for storing applications 110A, 110B, . . . 110N. One of these applications 110A, 110B, . . . 110N is a so-called "Help Me" application 112 stored in memory portion 108. This application 112 provides services as disclosed herein. Memory 108 has a portion for storing a payment card profile 114.

Communication device 100 can include voice synthesis and recognition services 116. Such voice and recognition services 116 are well known in the art. Communication device 100 can include a location module 118, which may be a GPS receiver, to receive information from at least one satellite 120. Location module 118 provides information concerning the current location of communication device 100. The current location data may be used to direct telephone calls or Internet communications to the appropriately located call center or web site to facilitate communication, e.g., to obtain payment card information from a domestic or international location. Further features of communication device 100 include a viewing screen 122 and a keyboard 124. Keyboard 124 can have actual keys, in the manner of a smart mobile telephone, or may be a virtual keyboard on screen 122, if screen 122 is configured as a touchscreen.

Figure 4:
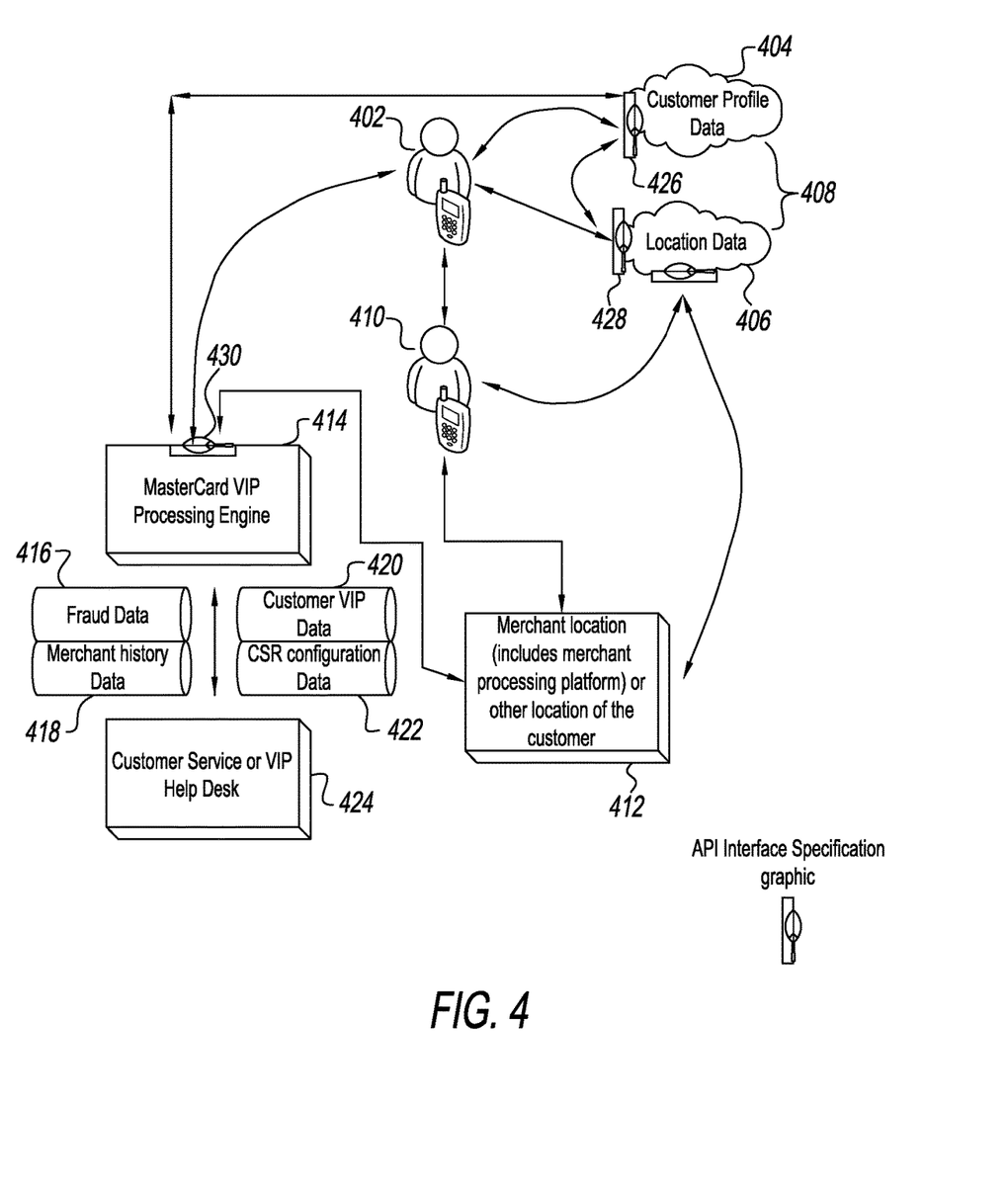
FIG. 4 depicts a diagram of a system and method for implementing an exemplary embodiment of the present disclosure.

Communication device 100 can communicate with a call center 126 via a telephone connection 128 made using standard mobile telephone technology. Call center 126 can redirect the call, as needed, to a payment card issuer call center 130, a self-service call center 132 or an answering agent, represented by 134, depending either on the cardholder's preference or the service that is available. Call center 126 has access (not shown in FIG. 1) to a benefits database to assist in processing calls from communication device 100. Call center 126 also has access (not shown in FIG. 1) and can redirect a call, as needed, to the customer service or the VIP help desk 424 as shown in FIG. 4.

Call center 126 may be operated by MasterCard®, the assignee of the present application. MasterCard® operates what is known as a "four-party" open payment card system. The four key participants in a four-party system are: (i) the customer and business cardholders that use the cards; (ii) the merchants that accept the cards; (iii) the financial institutions that issue the cards (referred to as the card issuer); and (iv) the financial institutions that sign up merchants to accept the cards (referred to as the acquirer).

The system of this disclosure is based on an internal global positioning system "GPS" type location system and geofencing. When a customer gets to a store, one of two things can happen. If the store has already been tagged as "favorite" in the "Help Me" application of customer, then the store will know that the customer is in the store and the application will open up with that store's page already open. If the store has not been previously tagged, but the store is part of the "Help Me" network, the application will note to the store that a "Help Me" customer is onsite but with no identifying information. The application will open to the main page where the customer can easily connect to the store they are currently standing in. Geofencing provides the capability, within or surrounding a merchant location or other designated location, for establishing a geofence or perimeter. When the geofence or perimeter is crossed, an alert can be triggered on the mobile device of the customer or store clerk.

If the same scenario as above were to happen, the customer would click on the "Help Me" application, identify which section they are in currently looking for help or where they will need help and at what time they will need that help (e.g., the customer will be leaving the computer department and moving to the TV department in 10 minutes and would like someone in the TV department at that time to answer questions). The store then can either identify them specifically (if they have entered certain information into the "Help Me" application) or just know generically that a "Help Me" customer is looking for help, what section they are currently in or will be in at what time, and send the appropriate help to that department.

Figure 2:
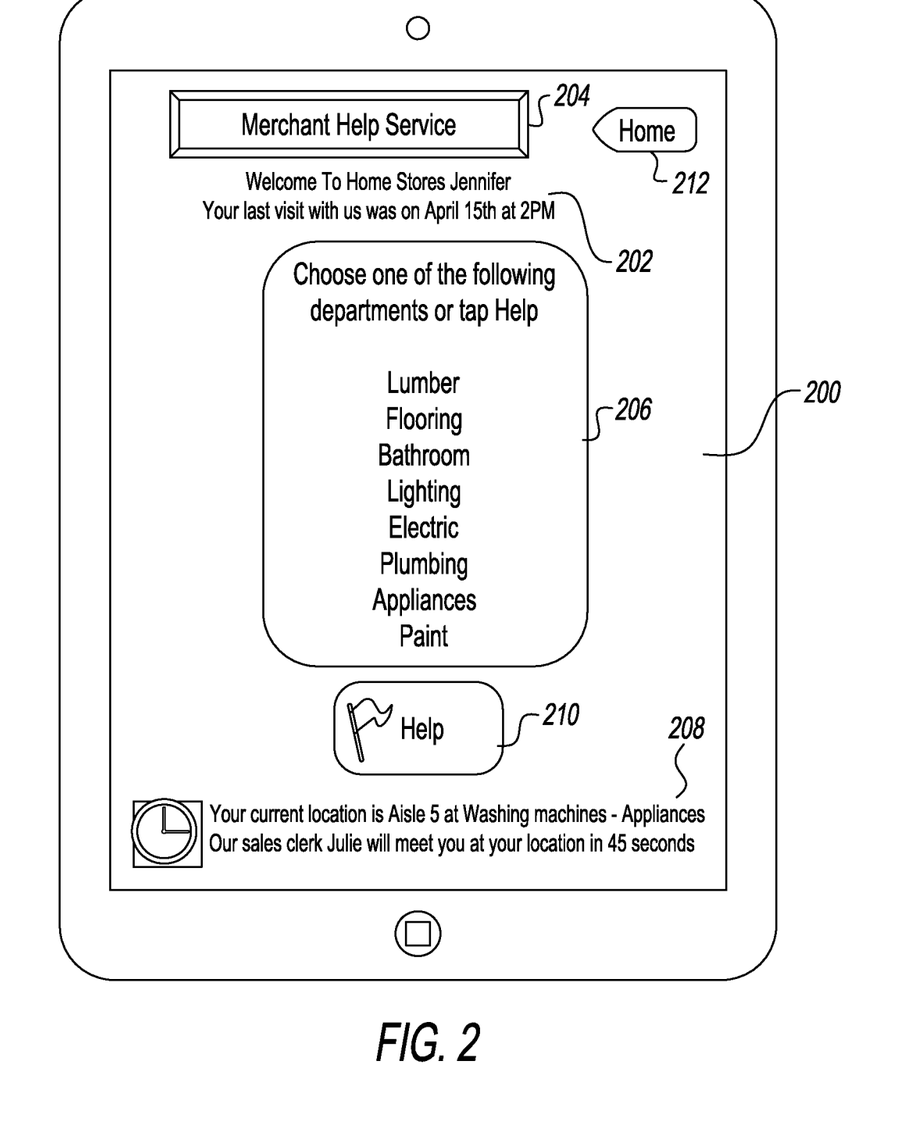
FIG. 2 depicts a screen from a mobile communication device that shows a content menu for the system according to the present disclosure.

Referring to FIG. 2, an exemplary use of the system according to the present disclosure will be described in reference to screens depicted in the referenced FIGS. 2 and 3. Referring to FIG. 2, a user from a mobile device home screen opens the "Help Me" application to the "Help Me" application home screen 200 in a known fashion. A welcome message 202 appears indicating, for example, the date and time of the last visit of the customer to the merchant facility. If not already notified automatically, the customer may select Merchant Help Service button 204 to notify the merchant that the customer is in the facility. From the "Help Me" application home screen 200, a user can make a selection from the content menu 206, and then make a selection from mobile screen user interface in a known fashion. Content menu 206 shows various selections that can be made such as Lumber, Flooring, Bathroom, Lighting, Electric, Plumbing, Appliances and Paint. After making a selection from content menu 206, a message 208 will appear on the screen notifying the customer of his or her location in the facility, and also the time when the sales person will meet the customer at the designated location.

If a particular department desired by the customer is not listed in content menu 206, the customer can tap Help button 210 for assistance. A user can return to the mobile device home screen by tapping Home button 212.

Additionally, a merchant can have a VIP designation for certain customers who shop often and, instead of a TV specific sales clerk, the merchant could send a personal shopper type expert who could then remain with the client throughout the shopping experience or simply answer a few questions based on the needs of the client. Regardless of a customer's "high roller" designation or not, the customer knows that within a few minutes someone will be on their way to help. The "Help Me" application on a customer's phone could flash or list a countdown timer to indicate to the store personal who they are supposed to help or a response from the store could actually be sent with the sales clerk's name. The sales clerk can then easily link up with the person who requested help and close the sale.

Figure 3:
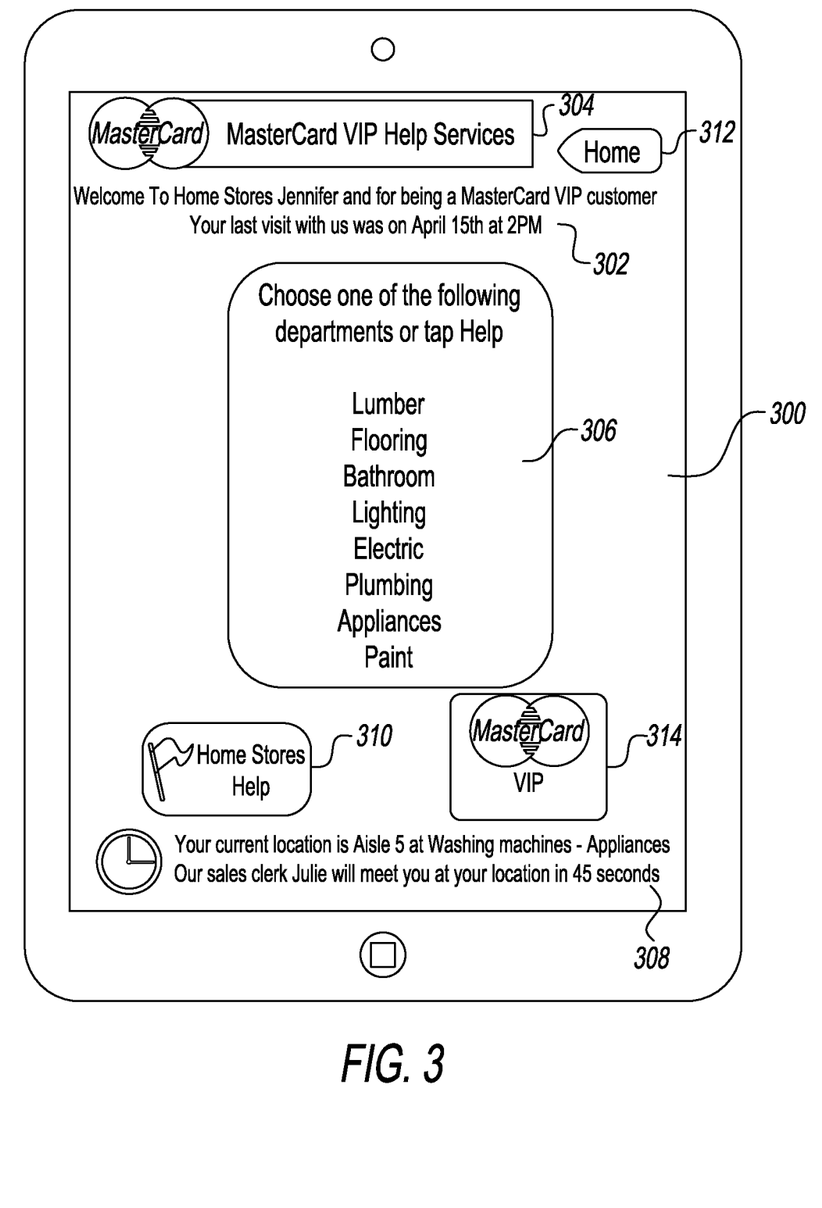
FIG. 3 depicts a screen from a mobile communication device that shows a VIP content menu for the system according to the present disclosure.

Referring to FIG. 3, another exemplary use of the system according to the present disclosure will be described in reference to screens depicted in the referenced FIGS. 2 and 3. FIG. 3 refers to a user that has attained an upgraded status as a payment card customer ("VIP user or customer"). Referring to FIG. 3, a VIP customer from a mobile device home screen opens the "Help Me" application to the "Help Me" application home screen 300 in a known fashion. A welcome message 302 appears indicating, for example, the date and time of the last visit of the VIP customer to the merchant facility. If not already notified automatically, the VIP user may select MasterCard® VIP Help Service button 304 to notify the merchant that the VIP customer is in the facility. From the "Help Me" application home screen 300, a VIP user can make a selection from the content menu 306, and then make a selection from mobile screen user interface in a known fashion. Content menu 306 shows various selections that can be made such as Lumber, Flooring, Bathroom, Lighting, Electric, Plumbing, Appliances and Paint. After making a selection from content menu 306, a message 308 will appear on the screen notifying the VIP customer of his or her location in the facility, and also the time when the sales person will meet the VIP customer at the designated location.

In accordance with this disclosure, a VIP customer may talk directly with a MasterCard® VIP customer representative at any time. The MasterCard® VIP desk can also make direct contact with a merchant and summon the merchant to the location of the VIP customer. In an embodiment, the MasterCard® VIP customer service representative and merchant clerk can work together to assist the VIP customer.

If a particular department desired by the VIP customer is not listed in content menu 306, the VIP customer can tap Help button 310 for assistance. A VIP user can return to the mobile device home screen by tapping Home button 312.

Figure 6:
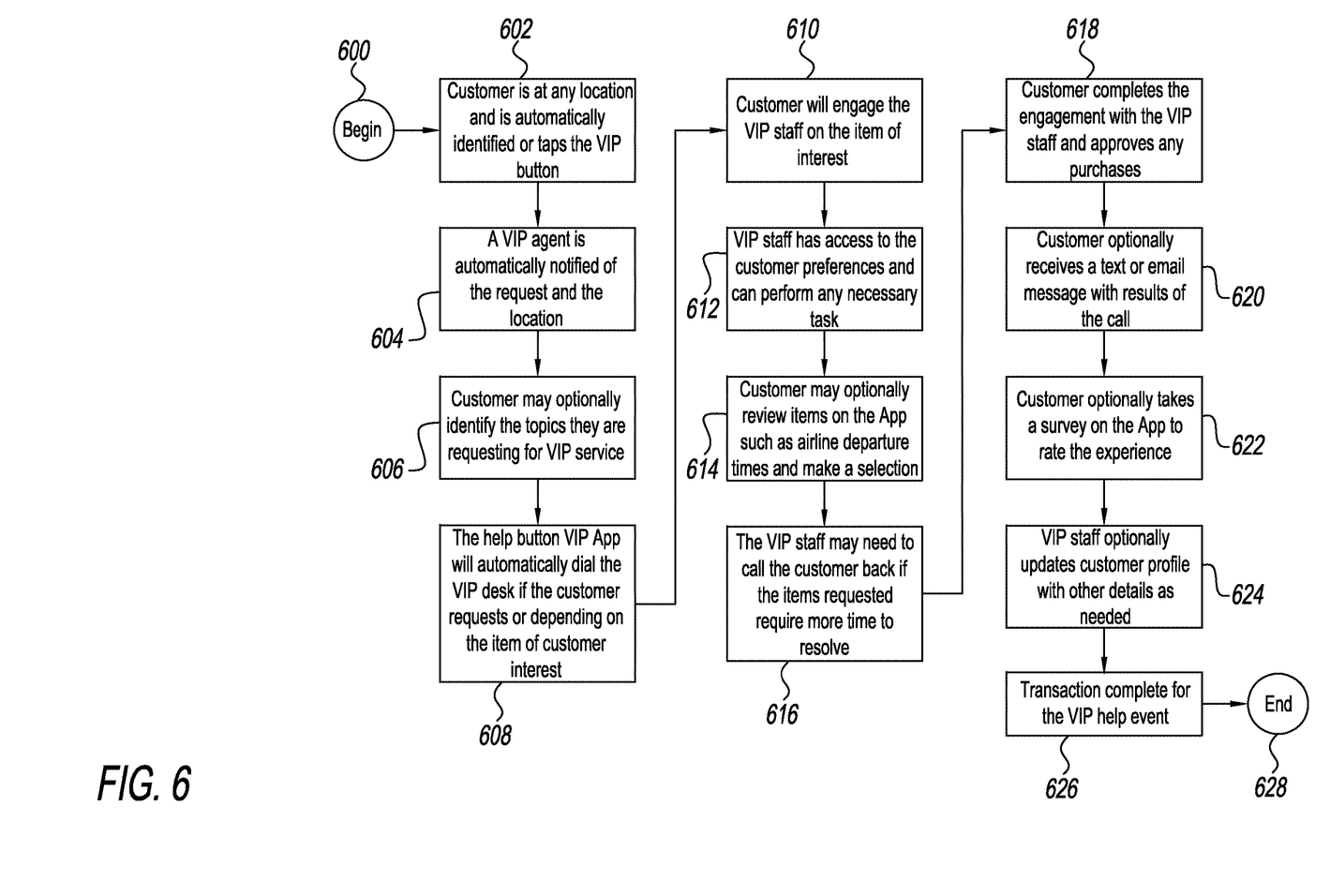
FIG. 6 is a flow chart illustrating in part the operation of the VIP system and method of FIG. 4 and method in accordance the present disclosure.

In addition, the VIP customer can tap the MasterCard® VIP button 314 to directly contact the payment card company VIP desk, e.g. MasterCard® VIP desk. The VIP customer can then engage the payment card company VIP staff on the particular item of interest as illustrated in FIG. 6. The MasterCard® VIP button 314 and the merchant Help button 310 can be integrated as shown in FIG. 6 or they can be separate. The MasterCard® VIP button 314 can appear in any mobile application and can appear by itself. It does not have to be combined with the merchant Help button 310. For example, FIG. 2 includes only the merchant Help button 210. The MasterCard® VIP button 314 can appear on the mobile device home screen along with the "Help Me" application.

Referring to FIG. 4, at 402, a customer of the system and method of the present disclosure invokes the "Help Me" application 112 on communication device 100. The customer has the option on a home screen of calling up a settings screen, so that user can customize settings for the "Help Me" application 112. Such customized settings include, but are not limited to, customer identification information, a password if desired, what functions of the "Help Me" application 112 will be utilized, and screen configurations settings, such as size of type. The customer is provided with the option of calling the operator of the payment card system via the call center 126 of FIG. 1 for any assistance that the customer requires in setting up the "Help Me" application 112, or for other reasons as described below.

An access path for allowing access to the cardholder profile information 404 and location information 406 is shown in FIG. 4. At 402, after a customer invokes the "Help Me" application 112, and the customized settings have been applied to the "Help Me" application 112 as described above, the customer accesses an electronic storage device 408, e.g., network or web site, having a database of cardholder profile information 404 and location information 406 stored therein.

An electronics storage device 408 having a database of cardholder profile information 404 and location information 406 stored therein is included in the network or web service. A processor for assembling the cardholder profile information 404 and location information 408 stored in the database, and for providing the assembled cardholder profile information and location information to a cardholder and merchant that have been granted access to the database, is also included in the electronics storage device 408. An application programming interface (API) 426 in included for the database of cardholder profile information 404. A separate application programming interface (API) 428 is included for the database of location information 406.

While access to the electronic storage device 408, e.g., network or web site, is most conveniently provided by communication device 100 in the form of a mobile telephone, in appropriate circumstances network or web site 408 may be accessed from a home or business computer, a personal digital assistant, any other Internet connected communication device, such as, a tablet or other mobile device (for example, an iPad® or an Ultrabook), or any stationary device, such as, for example, a kiosk.

A merchant that is part of the "Help Me" network also has access to the electronic storage device 408, e.g., network or web site, having the database of cardholder profile information 404 and location information 406 stored therein. For example, when a customer enters a merchant store and is automatically identified or taps the Merchant Help Service button 204, the sales person, clerk, assistant, etc. 410 at the merchant facility is automatically notified of the customer request and the location of the customer. At the merchant location 412, the customer's location is detected by a processing platform, e.g., the merchant's application. The customer's location is detected inside and outside of a merchant facility.

For VIP customers, the VIP customer and merchant can be connected to a payment card company VIP center or processing engine 414 or a VIP help desk 424. At payment card company VIP center or processing engine 414, the customer can engage a VIP staff for a particular item of interest. The VIP staff has access to the database of cardholder profile information 404 and location information 406 (e.g., preferences, loyalty points number, a digital wallet, other electronic payment systems, a shopping cart, various mobile offerings, etc.) and can perform any necessary task. The payment card company VIP center or processing engine 414 can include, for example, fraud data 416, merchant history data 418, customer VIP data 420, CSR configuration data 422, and the like. An application programming interface (API) 430 is included for the payment card company VIP center or processing engine 414.

For customers that are not VIP customers, those customers can have access to a customer service or help desk 424. The customer service or help desk 424 can be the same as the MasterCard call center 126 (see FIG. 1). The customer service or help desk 424 and the MasterCard call center 126 can provide requested information to a customer such as benefits that may apply to a particular purchase.

This disclosure allows a merchant to better manage customer expectations. For example, if all the TV sales people are busy, they can alert the customer to that fact and either suggest other areas of the store that weren't as busy (in case the customer needed a number of different things they could know how to route themselves through the store to maximize the help they got in the shortest time) or the "Help Me" application could start a queue and, just like at restaurants, alert the customer when it is his or her turn.

The system and method of this disclosure provides a much more streamlined way for customers to find support when and where they need it. From the merchant's perspective, it is also much more streamlined as well as giving them additional data they never had before. For example, part of the "Help Me" application can be sales clerk initiated, e.g., either a phone or some sort of communication device (pager-like) that the sales clerk uses to "start" the helping process. In this example, the sales clerk has to click something at the start of his or her time with the customer. At the end of the sales interaction, the sales clerk would click something again to stop the process meaning that the sales interaction is over.

Such a system and method will help the store gain valuable information of the typical length of time it takes the sales folks to answer questions in the different departments. Additionally, the sales clerk can indicate whether or not a sale happened or this information can be generated by the customer. The customer can also get a chance to rate their sales person which would help make sure that their sales person was actually attentive and answering questions rather than just trying to get to the next person. And a customer can also self identify that they need a personal shopper from the start, which would free up other sales clerks who had customer's with one product question.

The merchant may also be able to generate trends from the data generated from system and method of this disclosure and actually staff according to quantitative data of how many people they need on a specific day. Merchants may also be able to track returns, chargebacks, and the like, that can be valuable information for their business.

Figure 5:
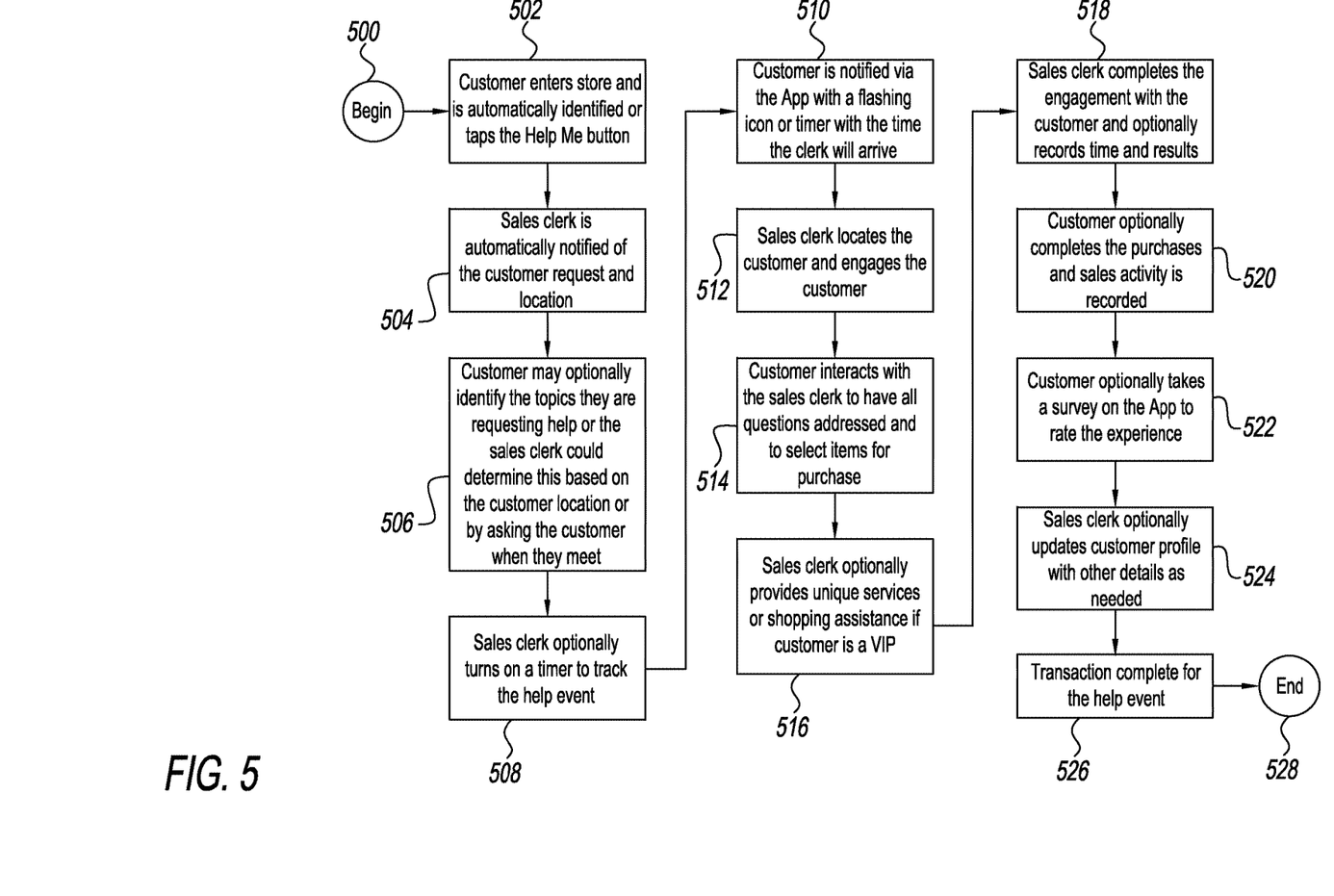
FIG. 5 is a flow chart illustrating the operation of the system and method of FIG. 4 in accordance the present disclosure.

Referring to FIG. 5, at 500, a customer of the system and method of the present disclosure invokes the "Help Me" application 112 on communication device 100. At 502, the customer enters the merchant facility and is either automatically identified (e.g., the store has already been tagged a favorite in the "Help Me" application) or the customer taps the Merchant Help Service button 204. If the store has not been previously tagged, but the store is part of the "Help Me" network, the application will note to the store that a "Help Me" customer is onsite but with no identifying information.

At 504, the sales clerk is automatically notified of the customer request and the location of the customer. At the merchant location 412 (see FIG. 4), the customer's location is detected by a processing platform, e.g., the merchant's application. Optionally, a preferred sales clerk can be requested by the customer. The location of the customer can be either inside or outside of the store. The location information 406 from the database 408 can be used by the merchant to identify the location of the customer.

The location information can include 2D or 3D global positioning system (GPS) mapping and geofencing. Inside the store, the location information can include floor plans. For example, the location information of the "Help Me" application can give a customer directions in essence to the department or section or item that he or she is looking for in the merchant facility. This could be in the form of text such as "You need to go to aisle 5" or something like a top-down view of the store layout and then a dotted line appears between where you are and the department or section that you are looking for.

The customer may identify the topics that he or she is requesting assistance or help for at 506. Alternatively, the sales person can determine this based on the customer location in the store or by asking the customer when they meet. Referring to FIG. 2, a customer can make a selection from the content menu 206 (e.g., Lumber, Flooring, Bathroom, Lighting, Electric, Plumbing, Appliances and Paint), and then make a selection from mobile screen user interface in a known fashion.

The merchant may have a desire to track the performance or efficiency of the transaction. One metric for determining efficiency may be the length of time for a particular transaction. Therefore, at 508, the sales person can turn on a timer to track the time for the particular transaction.

Referring to FIG. 2, the customer is notified via the "Help Me" application home screen 200, after making a selection from content menu 206, a message 208 will appear on the screen notifying the customer of his or her location in the facility, and also the time when the sales person will meet the customer at the designated location. At 510, this customer notification can be with a flashing icon or a timer with the time that the sales person will arrive. Based on this information, the sales person locates the customer in the store and engages the customer at 512.

At 514, the customer interacts with the sales person to have all questions addressed and to select items for purchase. If the customer is a VIP customer, the sales person provides unique services of shopping assistance at 516.

After the customer completes selection of items for purchase, the sales person completes his or her engagement with the customer at 518. At this time, the sales person may record the time and the results of the transaction. This information is important for merchants having a desire to track the performance or efficiency of the transaction, e.g., one metric for determining efficiency being the length of time for completing a particular transaction.

Likewise, when the customer completes the purchases at 520, the sales activities for the particular transaction can be recorded in the database of cardholder profile information 404 under merchant information or preferences. The customer can optionally take a survey at 522 on the "Help Me" application to rate the experience. This information can also be included in the database of cardholder profile information 404 under merchant information or preferences.

In addition to information received from the survey at 522, the sales person can optionally update at 524 the database of cardholder profile information 404 with other details as needed for future transactions. The transaction is complete at 526 for the particular transaction and ends at 528.

Referring to FIG. 6, at 600, a VIP customer of the system and method of the present disclosure invokes the "Help Me" application 112 on communication device 100. At 602, the VIP customer can be at any location or enters the merchant facility and is either automatically identified (e.g., the store has already been tagged a favorite in the "Help Me" application) or the VIP customer taps the MasterCard® VIP button 314.

At 604, the VIP sales agent is automatically notified of the VIP customer request and the location of the VIP customer. The location of the VIP customer can be either inside or outside of a store. The location information 406 from the database 408 can be used by the VIP sales agent to identify the location of the VIP customer. The location information can include 2D or 3D global positioning system (GPS) mapping and geofencing, and can include floor plans of a particular store.

The VIP customer may identify the topics that he or she is requesting VIP assistance or help for at 606. Referring to FIGS. 3 and 4, at 608, the VIP customer using MasterCard® VIP button 314 can automatically dial a payment card company VIP center or processing engine 414 or a VIP help desk 424. At payment card company VIP center or processing engine 414, the customer can engage a VIP staff for a particular item of interest at 610. The VIP staff has access to the database of cardholder profile information 404 and location information 406 (e.g., preferences, loyalty points number, a digital wallet, other electronic payment systems, a shopping cart, various mobile offerings, etc.) and can perform any necessary task at 612. The payment card company VIP center or processing engine 414 can include, for example, fraud data 416, merchant history data 418, customer VIP data 420, CSR configuration data 422, and the like.

At 614, the VIP customer may directly review items on the "Help Me" application screen 300 such as airline departure times and make a selection. The VIP staff may need to call the VIP customer back at 616 in the items requested require more time to resolve.

After the VIP customer completes selection of items for purchase, the sales person completes his or her engagement with the VIP customer at 618. The VIP customer can receive a text or e-mail message with the results of the transaction. At this time, the sales person may record the time and the results of the transaction at 620. This information is important for merchants having a desire to track the performance or efficiency of the transaction, e.g., one metric for determining efficiency being the length of time for completing a particular transaction.

Likewise, when the VIP customer completes the purchases at 618, the sales activities for the particular transaction can be recorded in the database of cardholder profile information 404 under merchant information or preferences. The VIP customer can optionally take a survey at 622 on the "Help Me" application to rate the experience. This information can also be included in the database of cardholder profile information 404 under merchant information or preferences.

In an embodiment, the application can also rate the customer meaning the store can track an average help time for individual customers. If the store knows that a VIP or "high roller" customer is in the building but the store also knows that the VIP or "high roller" customer needs extra hand holding and way more time than a normal shopper, but it is worth it because that customer will then actually buy a lot and not return anything, then the store can assign a personal shopper. The store will know that individual personal shopper will be out of commission for quite some time. This embodiment will also help if another VIP customer enters and requests that same personal shopper. The store will know that the particular clerk will not be available for a while and can alert the other VIP customer and offer up another person to help them.

In addition to information received from the survey at 622, the sales person can optionally update at 624 the database of cardholder profile information 404 with other details as needed for future transactions. The transaction is complete at 626 for the particular transaction and ends at 628.

The "Help Me" application itself can have other additional value added services for the customer such as floor plans. A layout of the store itself can be part of the "Help Me" application so even though you know how a Target store is laid out in one location, it might have a different layout in another location, which can lead to wasted time trying to find desired goods and frustration on the part of the customer. The floor plans can include 2D or 3D global positioning system (GPS) mapping and geofencing.

In an embodiment, the floor plans including 2D or 3D global positioning system (GPS) mapping and geofencing inside a merchant facility can help direct an employee to a desired inventory stored at the merchant facility. If a customer is looking for an item that is not readily available in store shelves but is available in the merchant's inventory in a backroom of the store, the method of this disclosure can help an employee who is looking for an inventoried item for a customer. This is especially valuable depending on how merchants stack, store or organize their backrooms where they keep inventory, and how much inventory turnover occurs in a given period of time. For example, chips or Wifi capability can be added to pallets themselves and then tied it into a room mapping system so that employees can immediately call up the map and find exactly where inventory is. If a pallet needs to be moved, the map would still be able to track it, and the customer wouldn't have to be told "we should have some more stock but we don't know where it is right now."

The "Help Me" application can be launched and a "You are Here" button shows up, and if a customer inputs what they are looking for, the application would give them directions in essence to the department or section or item they are looking for in the merchant facility. This could be in the form of text such as "You need to go to aisle 5" or something like a top-down view of the store layout and then a dotted line appears between where you are and the department or section that you are looking for.

In another embodiment, the customer can also list a few needed items and the "Help Me" application can show the customer the most efficient route through the store to get everything that they need. The instructions can be either text such as "You need to go to aisle 5, then 3, then 4, then 12" or a map with locations showing up with a colored dot or the numbers 1, 2, 3 etc.

The "Help Me" application can also be a way to push coupons or offers or other incentives to customers to buy in store. In marketing, a coupon is a ticket or document that can be exchanged for a financial discount or rebate when purchasing a product. Customarily, coupons are issued by manufacturers of consumer packaged goods or by retailers, to be used in retail stores as a part of sales promotions. They are often widely distributed through mail, magazines, newspapers, the Internet, directly from the retailer, and mobile device or portable device (e.g. mobile device, telephone, smart phone, PDA, laptop computer, Android, iOS devices, iPhone, iPad, etc.) is such as cell phones.

Online retailers often refer to coupons as "coupon codes," "promotional codes," "promotion codes," "discount codes," "key codes," "promo codes," "surplus codes," "portable codes," "shopping codes," "voucher codes," "reward codes," "discount vouchers," "free coupons," "discounted coupons," or "source codes." Online coupons typically provide for reduced cost or free shipping, a specific dollar or percentage discount, or some other offer to encourage customers to purchase specific products or to purchase from specific retailers. Marketers can use different codes for different channels or groups in order to distinguish response rates.

The customer has an option to call an agent at call center 126 (see FIG. 1) or customer service or VIP help desk 424 (see FIG. 4). The customer will use this if the customer wants to engage services that are not routine, such as, for example, clarification of a benefit, changing or adding a benefit if still possible, or other tasks that require the intervention of a human being.

As indicated herein, communication device 100 can communicate with a call center 126 or customer service or VIP help desk 424 via a telephone connection 128 made using standard mobile telephone technology. The call center 126 and customer service or VIP help desk 424 can have access (not shown in FIGS. 1 and 4), for example, to a benefits database to assist in processing calls from communication device 100. At times, the customer or cardholder may be interested in benefits associated with a particular purchase. Such benefits include, but are not limited to, extended warranty on purchases, price protection, insurance, roadside assistance, emergency travel assistance, foreign transaction fees, rental car insurance, and hotel and airline upgrades. The benefit summary can be verbally provided to the cardholder or provided on a screen of the "Help Me" application 112 on communication device 100. A voice button can be clicked at 116 and synthesize the benefit summary and output to speaker.

While access to the call center 126 and customer service or VIP help desk 424 is most conveniently provided by communication device 100 in the form of a mobile telephone, in appropriate circumstances call center 126 and customer service or VIP help desk 424 may be accessed from a home or business computer, a personal digital assistant, any other Internet connected communication device, such as, a tablet or other mobile device (for example, an iPad® or an Ultrabook), or any stationary device, such as, for example, a kiosk.

The system and method described herein allows customers to access assistance and help at a merchant facility in a quick and simple manner, with just a few clicks or operations of a simple application on a communication device. The customer need not remember any payment card or call center contact information if the customer chooses not to do so. The customer can be routed to an appropriate geographic call center and to an agent based on the customer's needs.

The ability to access assistance and help at a merchant facility associated with payment cards quickly increases consumer confidence. The potential cost savings to the customer, not to mention a significant reduction in personal time waste, resulting from receiving timely assistance and help in a transaction with a merchant that is associated with payment cards is very attractive to customers. Thus, the customer is more likely to use the payment cards with this acquired knowledge of the benefits associated therewith.

The system and method disclosed herein can be a stand-alone offering, or can be integrated into various financial products such as, for example, a digital wallet, other electronic payment systems, a shopping cart, and various mobile offerings.

The system and method disclosed herein allow the assistance and help to be accessed with a mobile platform or device. If appropriate, a service charge can be imposed on a monthly or yearly basis for the convenience of use of the system and method disclosed herein. Payment cards are likely to be more popular if this service is available.

It will be understood that the present disclosure may be embodied in a computer readable non-transitory storage medium storing instructions of a computer program that when executed by a computer system results in performance of steps of the system or method described herein. Such storage media may include any of those mentioned in the description above.

In particular, there is provided a computer readable non-transitory storage medium storing instructions of a computer program, which when executed by a computer system, results in performance of steps of: storing in an electronic storage device a database of cardholder profile information and location information; accessing the database; and providing information concerning the cardholder profile information and location information to a cardholder and/or merchant that has been granted access to the database.

The computer readable non-transitory storage medium can further comprise instructions of a computer program for configuring the database to store, at least in part, data associated with a geographical area call center.

The terms "comprises" or "comprising" are to be interpreted as specifying the presence of the stated features, integers, steps or components, but not precluding the presence of one or more other features, integers, steps or components or groups thereof.

It should be understood that various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

What is claimed is:

1. A system for facilitating a transaction between a merchant and a cardholder by a financial transaction processing entity, said system comprising:
   an electronic storage device having a database of cardholder profile information, cardholder location information, and merchant location information stored therein, wherein the cardholder location information is from a location module of a first communication device of the cardholder comprising a first global positioning system (GPS) receiver, the first communication device comprising an application that can be activated by the cardholder with a request of the transaction, wherein the merchant location information is from a merchant processing platform comprising a GPS that maps both inside and outside of a facility of the merchant and includes floor plans inside the facility of the merchant, wherein the cardholder location information includes 2D and 3D GPS mapping and geofencing, a processing engine comprising an interface, wherein the interface is configured for communication (1) between the first communication of the cardholder and the processing engine, and (2) between a second communication device of the merchant comprising a second GPS receiver and the processing engine, wherein the merchant is notified of the request of the transaction, and wherein the GPS sends a first GPS signal to the first GPS receiver to direct the cardholder to a desired area or sends a second GPS signal to the second GPS receiver to direct an employee of the merchant to a desired inventory stored at the facility of the merchant;

an access path for allowing access, granted by the financial transaction processing entity, to the cardholder profile information, the cardholder location information, and the merchant location information by the merchant and the cardholder, wherein the cardholder profile information, the cardholder location information and the merchant location information are located in the processing engine; and a processor configured to:

establish a geofence or perimeter within or surrounding the merchant facility location by the GPS so that the GPS sends an alert to the first communication device of the cardholder or the second communication device of the merchant when the geofence or perimeter is crossed by the payment cardholder;

determine whether the merchant is tagged in the application of the first communication device when the payment cardholder enters an area defined by the geofence or the perimeter;

operate the application to (1) open an application page of the merchant when the merchant is tagged in the application, or (2) open a main application page leading to a connection to the application page of the merchant when the merchant is not tagged in the application but the merchant is a part of a network of the application;

assemble the cardholder profile information and the cardholder location information in the database, and provide the assembled cardholder profile information and the cardholder location information via the processing engine to the second communication device of the merchant and the first communication device of the cardholder by the financial transaction processing entity, thereby effecting an in-person interaction between the cardholder and an agent of the merchant.

2. The system of claim 1, wherein the assembled cardholder profile information, the cardholder location information and the merchant location information are provided to the merchant and the cardholder that have been granted access to the database so as to effect targeted interaction between the agent of the merchant and cardholder based at least in part on the assembled cardholder profile information, the cardholder location information, and the merchant location information.

3. The system of claim 2, wherein targeted interaction comprises services and assistance on the part of the agent of the merchant and questions and requests on the part of the cardholder, for facilitating the transaction between the merchant and the cardholder.

4. The system of claim 1, wherein the access path comprises a network or web site for making the assembled cardholder profile information, the cardholder location information, and the merchant location information available to the merchant and the cardholder.

5. The system of claim 4, wherein the access path includes an Internet connected device for connecting to the network or web site.

6. The system of claim 5, wherein said Internet connected device is one selected from the group consisting of a mobile telephone, a computer, a tablet, and a personal digital assistant.

7. The system of claim 1, wherein based at least in part on the assembled cardholder profile information, the cardholder location information and the merchant location information, the merchant provides a feature selected from the group consisting of timely and targeted services and assistance to the cardholder.

8. The system of claim 1, wherein the cardholder profile information includes preferences, loyalty points number, a digital wallet, other electronic payment systems, a shopping cart, and mobile offerings.

9. The system of claim 1, wherein the database further includes online coupons, location-based services, location-based deals and offers, and advertisements that can be accessed by the cardholder.

10. The system of claim 1, wherein access to the database is granted through a communication device.

11. The system of claim 10, wherein the communication device is configured as a mobile platform.

12. The system of claim 1, further comprising said cardholder communicating with a call center to obtain payment card benefit information.

13. The system of claim 12, wherein the payment card benefit information comprises one or more information selected from the group consisting of extended warranty on purchases, price protection, insurance, roadside assistance, emergency travel assistance, foreign transaction fees, rental car insurance, and hotel and airline upgrades.

14. A method for facilitating a transaction between a merchant and a cardholder by a financial transaction processing entity, said method comprising:

providing an electronic storage device having a database of cardholder profile information, the cardholder location information and merchant location information stored therein, wherein the cardholder location information is from a location module of a first communication device of the cardholder comprising a first global positioning system (GPS) receiver, the first communication device having an application that can be activated by the cardholder with a request of the transaction, wherein the merchant location information is from a merchant processing platform comprising a GPS that maps both inside and outside of a facility of the merchant and includes floor plans inside the facility of the merchant, wherein the cardholder location information includes 2D and 3D GPS mapping and geofencing;

providing a processing engine comprising an interface, wherein the interface is configured for communication (1) between the first communication of the cardholder and the processing engine, and (2) between a second communication device of the merchant comprising a second GPS receiver and the processing engine, wherein the merchant is notified of the request of the transaction, and wherein the GPS sends a first GPS signal to the first GPS receiver to direct the cardholder to a desired area or sends a second GPS signal to the second GPS receiver to direct an employee of the merchant to a desired inventory stored at the facility of the merchant;

allowing access, granted by the financial transaction processing entity, via an access path to the cardholder profile information, the cardholder location information and the merchant location information by the merchant and the cardholder, wherein the cardholder profile information, the cardholder location information and the merchant location information are located in the processing engine;

establishing a geofence or perimeter within or surrounding the merchant facility location by the GPS so that the GPS sends an alert to the first communication device of the cardholder or the second communication device of the merchant when the geofence or perimeter is crossed by the payment cardholder;

determining, by a processor, whether the merchant is tagged in the application of the first communication device when the payment cardholder enters an area defined by the geofence or the perimeter;

operating, by the processor, the application to (1) open an application page of the merchant when the merchant is tagged in the application, or (2) open a main application page leading to a connection to the application page of the merchant when the merchant is not tagged in the application but the merchant is a part of a network of the application;

assembling in the database via the processor the cardholder profile information and location information; and providing, by the processor, the assembled cardholder profile information and the cardholder location information via the processing engine to the second communication device of the merchant and the first communication device of the cardholder by the financial transaction processing entity, thereby effecting targeted interaction between the merchant and cardholder based at least in part on the assembled cardholder profile information and the cardholder location information, the targeted interaction comprising an in-person interaction between the cardholder and an agent of the merchant.

15. The method of claim 14, wherein said targeted interaction comprises services and assistance on the part of the agent of the merchant and questions and requests on the part of the cardholder, for facilitating the transaction between the merchant and the cardholder.

16. The method of claim 14, wherein the access path comprises a network or web site for making the assembled cardholder profile information, the cardholder location information and the merchant location information available to the merchant and the cardholder.

17. The method of claim 16, wherein the access path includes an Internet connected device for connecting to the network or web site.

18. The method of claim 17, wherein said Internet connected device is one selected from the group consisting of a mobile telephone, a computer, a tablet, and a personal digital assistant.

19. The method of claim 14, wherein based at least in part on the cardholder profile information, and the cardholder location information and the merchant location information, the merchant provides a feature selected from the group consisting of targeted services and assistance to the cardholder.

20. The method of claim 14, wherein the cardholder profile information includes preferences, loyalty points number, a digital wallet, other electronic payment systems, a shopping cart, and mobile offerings.

21. The method of claim 14, wherein the database further includes online coupons, location-based services, location-based deals and offers, and advertisements that optionally can be accessed by the cardholder.

22. The method of claim 14, wherein access to the database is granted through a communication device.

23. The method of claim 22, wherein the communication device is configured as a mobile platform.

24. The method of claim 14, further comprising said cardholder communicating with a call center to obtain payment card benefit information.

25. The method of claim 24, wherein the payment card benefit information comprises one or more information selected from the group consisting of extended warranty on purchases, price protection, insurance, roadside assistance, emergency travel assistance, foreign transaction fees, rental car insurance, and hotel and airline upgrades.

26. The method of claim 14, further comprising:
generating data based on the targeted interaction between the merchant and the cardholder; and
analyzing the generated data to determine efficiency of the transaction between the merchant and the cardholder.

27. The method of claim 14, further comprising:
generating data based on the targeted interaction between the merchant and the cardholder; and
analyzing the generated data to determine customer shopping trends at the merchant facility.

* * * * *